United States Patent
Georgiou et al.

(10) Patent No.: US 8,811,422 B2
(45) Date of Patent: Aug. 19, 2014

(54) SINGLE CHIP PROTOCOL CONVERTER

(75) Inventors: Christos J. Georgiou, Scarsdale, NY (US); Victor L. Gregurick, Hyde Park, NY (US); Indira Nair, Briarcliff Manor, NY (US); Valentina Salapura, Chappaqua, NY (US)

(73) Assignee: Microsoft Corporation, Redmond, WA (US)

( * ) Notice: Subject to any disclaimer, the term of this patent is extended or adjusted under 35 U.S.C. 154(b) by 26 days.

(21) Appl. No.: 13/269,065

(22) Filed: Oct. 7, 2011

(65) Prior Publication Data

US 2012/0082171 A1 Apr. 5, 2012

Related U.S. Application Data

(63) Continuation of application No. 12/189,675, filed on Aug. 11, 2008, now Pat. No. 8,036,243, which is a continuation of application No. 10/768,828, filed on Jan. 30, 2004, now Pat. No. 7,412,588, which is a continuation-in-part of application No. 10/604,491, filed on Jul. 25, 2003, now Pat. No. 7,353,362.

(51) Int. Cl.
*H04J 3/16* (2006.01)
*G06F 15/167* (2006.01)
*H04L 12/56* (2006.01)
*G06F 15/78* (2006.01)

(52) U.S. Cl.
CPC .......... *G06F 15/7842* (2013.01); *G06F 15/167* (2013.01); *H04L 49/602* (2013.01); *G06F 15/7832* (2013.01); *H04L 49/109* (2013.01)
USPC .......................................... 370/466; 370/465

(58) Field of Classification Search
CPC ................................................ H04L 29/06068
USPC .................................................. 370/466, 465
See application file for complete search history.

(56) References Cited

U.S. PATENT DOCUMENTS

| | | | |
|---|---|---|---|
| 4,633,394 A | 12/1986 | Georgiou et al. | |
| 4,751,634 A | 6/1988 | Burrus, Jr. et al. | |

(Continued)

FOREIGN PATENT DOCUMENTS

| | | |
|---|---|---|
| JP | 8-292932 | 11/1996 |
| JP | 10-161973 | 6/1998 |

(Continued)

OTHER PUBLICATIONS

IBM Corporation: "CoreConnect bus architecture", 3.ibm.com/chips/products/corconnect/; last printed Sep. 20, 2006, pp. 1-2.

(Continued)

*Primary Examiner* — Christopher Grey
(74) *Attorney, Agent, or Firm* — Dan Choi; Ramesh Kuchibhatla; Micky Minhas

(57) ABSTRACT

A single chip protocol converter integrated circuit (IC) capable of receiving packets generating according to a first protocol type and processing said packets to implement protocol conversion and generating converted packets of a second protocol type for output thereof, the process of protocol conversion being performed entirely within the single integrated circuit chip. The single chip protocol converter can be further implemented as a macro core in a system-on-chip (SoC) implementation, wherein the process of protocol conversion is contained within a SoC protocol conversion macro core without requiring the processing resources of a host system. The single chip protocol converter integrated circuit and SoC protocol conversion macro implementation include multiprocessing capability including processor devices that are configurable to adapt and modify the operating functionality of the chip.

20 Claims, 10 Drawing Sheets

(56) References Cited

U.S. PATENT DOCUMENTS

| | | | |
|---|---|---|---|
| 4,829,511 | A | 5/1989 | Georgiou |
| 4,929,939 | A | 5/1990 | Varma et al. |
| 4,952,930 | A | 8/1990 | Franaszek et al. |
| 5,056,058 | A | 10/1991 | Hirata et al. |
| 5,189,314 | A | 2/1993 | Georgiou et al. |
| 5,195,181 | A | 3/1993 | Bryant et al. |
| 5,229,994 | A | 7/1993 | Baizano et al. |
| 5,535,373 | A | 7/1996 | Oinowich |
| 5,586,273 | A | 12/1996 | Blair et al. |
| 5,640,399 | A | 6/1997 | Rostoker et al. |
| 5,651,002 | A | 7/1997 | Van Seters et al. |
| 5,708,659 | A | 1/1998 | Rostoker et al. |
| 5,720,032 | A | 2/1998 | Picazo et al. |
| 5,778,189 | A | 7/1998 | Kimura et al. |
| 5,798,918 | A | 8/1998 | Georgiou et al. |
| 5,838,935 | A | 11/1998 | Davis et al. |
| 5,905,873 | A | 5/1999 | Hartmann et al. |
| 5,931,933 | A | 8/1999 | Bilheimer et al. |
| 6,032,245 | A | 2/2000 | Georgiou et al. |
| 6,038,630 | A | 3/2000 | Foster et al. |
| 6,055,581 | A | 4/2000 | Berglund et al. |
| 6,065,038 | A * | 5/2000 | Chen .................... 709/200 |
| 6,088,800 | A | 7/2000 | Jones et al. |
| 6,215,412 | B1 | 4/2001 | Franaszek et al. |
| 6,262,594 | B1 | 7/2001 | Cheung et al. |
| 6,331,977 | B1 | 12/2001 | Spaderna et al. |
| 6,385,748 | B1 | 5/2002 | Chen et al. |
| 6,522,664 | B1 | 2/2003 | Kawahara |
| 6,662,253 | B1 | 12/2003 | Gary et al. |
| 6,678,535 | B1 | 1/2004 | Narayanaswami |
| 6,721,313 | B1 | 4/2004 | Van Duyne |
| 6,920,154 | B1 * | 7/2005 | Achler .................... 370/477 |
| 7,042,892 | B2 | 5/2006 | Young et al. |
| 7,412,588 | B2 | 8/2008 | Georgiou et al. |
| 7,647,472 | B2 | 1/2010 | Brightman et al. |
| 7,826,470 | B1 | 11/2010 | Aloni et al. |
| 2001/0042147 | A1 | 11/2001 | Adams et al. |
| 2001/0047465 | A1 | 11/2001 | Liu |
| 2002/0107903 | A1 * | 8/2002 | Richter et al. ............. 709/201 |
| 2002/0172197 | A1 | 11/2002 | Dale et al. |
| 2002/0174244 | A1 * | 11/2002 | Beckwith et al. ........... 709/231 |
| 2002/0176402 | A1 | 11/2002 | Karim |
| 2002/0184419 | A1 | 12/2002 | Creedon et al. |
| 2003/0046492 | A1 | 3/2003 | Gschwind et al. |
| 2003/0067913 | A1 | 4/2003 | Georgiou et al. |
| 2003/0067930 | A1 | 4/2003 | Salapura et al. |
| 2003/0105906 | A1 | 6/2003 | Zhao |
| 2005/0271059 | A1 | 12/2005 | Young et al. |

FOREIGN PATENT DOCUMENTS

| | | |
|---|---|---|
| JP | 10-506492 | 6/1998 |
| JP | 2000-004273 | 1/2000 |
| JP | 2001-506781 | 5/2001 |
| JP | 2001-325207 | 11/2001 |
| JP | 2005-505037 | 6/2007 |
| WO | WO 91/04401 | 4/1991 |
| WO | WO 98/28695 | 7/1998 |
| WO | WO 03/027877 A2 | 4/2003 |

OTHER PUBLICATIONS

ARM: "Processor Cores Overview", arm.com/armtech/opus?OpenDocument; last printed Sep. 20, 2006, pp. 1-2.

Broacade, Communications Systems for multiprotocol fabric routing services; biz.yahoo.com/prnews/0321028/sftu100_1.htm;]; dated unknown.

Ryu et al., "A Comparison of Five Different Multi processor SoC Bus Architectures", Georgia Institute of Technology Electrical and Computer Engineering, Atlanta, GA, date unknown.

Brinkman et al., "On-chip Interconnects for Next Generation System-on-Chips", Heinz Nixdorf Institute and Department of Electrical Engineering, University of Paderborn, Germany, date unknown.

Berry, "System-on-Chip Markets and Trends", Electronic Trend Publications, Inc., San Jose, CA, Second Edition, 2003, pp. 1-1-5-2.

Georgiou et al., A Programmable Scalable Platform for Next Generation Networking:, Proceedings of 2nd Network Processor Workshop, NP2, in conjunction with HPCA-9, Feb. 2003, Anaheim, CA, pp. 1-9.

IBM Corporation: "IBM introduces PowerPC 440 embedded processor", 3.ibm.com/chips/news/2003/0922_440ep.html; last printed Sep. 20, 2006, pp. 1-2.

"Motorola intelligence everywhere TM digital dna TM", Fact sheet MPC8560 Powerquicctm Integrated Communications Processor, Motorola, Inc., 2002.

Nair, "Effect of increasing chip density on the evolution of computer architectures", IBM J. Res & Dev. vol. 46, No. 2/3, Mar./May 2002, pp. 223-234.

Heddes, "IBM Power Network processor architecture" Proceedings of Hot Chips, Aug. 2000, XP002315023.

Nayfeh et al., "Exploring the Design Space for a Shared-Cache Multiprocessor", Computer Architecture News, Association for Computing Machinery, New York, US, vol. 22, No. 2, Apr. 1, 1994, pp. 166-175, XP000450348.

Georgiou, "The Blue GeneCyclops Project: from Supercomputers to Network Processors"< INET Online!, Apr. 4, 2003, XP002315236.

Heddes, IBM PowerNP network processor: Hardware, software, and applications, IBM Journal of Research and Development, vol. 47, No. 2-3, May 2003, XP002315024, pp. 177-193.

Youngsuk, "Network processors", INET, 'Online!, 2002, XP002315026, enc.umass.edu/eece/wolf/courses/ECE697J/Fall2002/presentations/ECE697J-02-11-12.pdf.

Almasi et al., "Dissecting Cyclops: a detailed analysis of a multithreaded architecture", ACM Sigarch Computer Architecture News, vol. 31, No. 1, Mar. 2003, XP002315027, pp. 27-28.

Shah et al., "Network Processors: Origin of Species", Proceedings of the 17th International Symposium on Computer and Information Sciences, 'Online!, 2002, XP002315025.

PCT/US2004/023784—Filed Jul. 23, 2004—PCT ISR/WO.

* cited by examiner

TYPICAL SoC ON THE MARKET TODAY EMPLOYING A SINGLE PROCESSOR

Prior Art

FIG. 2 TYPICAL SoC ON THE MARKET TODAY EMPLOYING PROCESS ACCELERATORS

Prior Art

MOTOROLA MPC5554 MICROCONTROLLER (SoC INCORPORATING CROSSBAR SWITCH)

Prior Art

Prior Art

SINGLE CHIP PROTOCOL CONVERTER EXAMPLE:
FIBRE CHANNEL (FC) TO GIGABIT ETHERNET
(GE) CONVERSION

MEMORY ALLOCATION WITHIN THE SINGLE CHIP PROTOCOL CONVERTER

SoC PROTOCOL CONVERTER PACKET FLOW—
HOST TO SoC MACRO

SINGLE CHIP PROTOCOL CONVERTER

CROSS-REFERENCE TO RELATED APPLICATIONS

This application is a continuation of U.S. patent application Ser. No. 12/189,675 filed Aug. 11, 2008; which is a continuation of U.S. patent application Ser. No. 10/768,828 filed Jan. 30, 2004, which is a continuation-in-part application of commonly-owned, co-pending U.S. patent application Ser. No. 10/604,491 entitled "Self-contained processor subsystem as component for System-on-Chip design", filed Jul. 25, 2003, the contents and disclosure of which is incorporated by reference as if fully set forth herein.

BACKGROUND OF THE INVENTION

1. Field of the Invention

The present invention relates to network processor devices and storage area networks, and in particular, a system and method to span multiple network protocols by providing an architecture for protocol conversion implemented within a single IC chip or as a sub-processor core component in a conventional SoC, DSP, FPGA, or similar integrated circuit sub-system.

2. Description of the Prior Art

As market shifts toward storage area networks (SAN) and network attached storage (NAS) systems, as well as with the massive expansion of the Internet, new demands on server and storage designs are placed. Storage attached via parallel SCSI connections is being replaced by Fibre Channel (FC) Storage Area Networks (SANS), and other emerging networking architectures, such as iSCSI and Fibre Channel over IP (FC-IP). iSCSI involves transfers of block data over TCP/IP networks, typically built around Gigabit Ethernet, while FC-IP is an Internet Protocol (IP) based storage networking technology which enables the transmission of FC information by tunneling data between SAN facilities over IP networks.

General purpose CPUs either cannot meet the computational requirements of the network protocol conversion, or are too expensive in terms of unit cost, space and power. This has led to the offloading of many of the networking and protocol processing functions from host processors into host-bus-adapters (HBAs) or Network Interface Controllers (NICs). Initially, most HBAs and NICs were implemented in ASICs using hardwired logic. But as the need to implement complex network protocols arose, such as TCP/IP or iSCSI, programmable solutions have become attractive because of a number of advantages they offer: they can accommodate different and evolving protocols; they are easily upgradeable via program changes; they offer a faster time to market.

The existing SANs are often physically remote, sometimes at greater distances, and are often using multiple network architectures. To consolidate existing SANs and to utilize existing WAN and LAN infrastructure there is a need for network protocol conversion, both in the data communications and telecommunications fields. The protocol conversion would allow seamless integration and operation of all different parts in the system.

A system level protocol convertor product was announced by Brocade Communications Systems for multiprotocol fabric routing services [http://biz.yahoo.com/prnews/031028/sftu100__1.html], which plan to provide Fibre Channel-to-Fibre Channel (FC-to-FC), iSCSI-to-FC bridging and Fibre Channel to FC-IP translation.

Existing protocol converters integrate multiple chips on a card to obtain desired logic functionality, or more commonly a host bus adapter card (HBA) plugged into a existing host system, or as a daughter card on a main host I/O card, resulting in bulky and a more costly product in terms of unit cost, space and power. In addition, existing protocol converters are not programmable or with very limited programmability, and not easily upgraded to accommodate different or new protocols. In addition, a variety of physical layer access modules or chips are present, their implementations and circuit technology often being optimized for one particular physical layer protocol, requiring the replacement of an entire Host Bus Adapter (HBA) card or several components when a newer physical layer protocol is required on a port. Conversion within the same physical I/O card is not typically done, and not within a single chip solution or as an embedded core within an SoC semiconductor device.

A System-on-Chip design 20 according to the prior art is illustrated in FIG. 1. It comprises a processing element such as a PPC440 (Power PC) 25, a local processor bus (PLB) 21, on-chip peripheral bus (OPB) 24, and a number of components, such as SRAM 15, DDR controller 18, PCI-X bridge 22, DMA 26 and DMA controller 28, an Ethernet Medium Access Control (MAC) protocol device 50 employed to provide the data link layer for an Ethernet LAN system, processor core timers 33 and interrupt controller 35, and an OPB bridge 29 interfacing with the OPB bus 24 and PLB 21. In the prior art implementation depicted in FIG. 1, I.B.M.'s embedded PowerPC 440 processor core and the CoreConnect local bus are utilized, but similar configurations may be found that use other embedded processor cores, such as ARM see, for instance, http://www.arm.com/products/?OpenDocument, MIPS (See MIPS: "MIPS32 4KP-Embedded MIPS Processor Core" at http://www.ce.chalmers.se/~thomasl/inlE/mips32 4Kp brief.pdf) processing cores, etc. As shown in FIG. 1, other devices provided for interfacing with the On-chip Peripheral bus 24 include one or more of the following: a RAM/ROM Peripheral controller 45a, an external bus master 45b, a UART device 45c, an Inter-IC bus (12C) interface 45d, general purpose I/O interface 45e and a gateway interface 45f.

Relevant references describing aspects of SoC processor and component design include:

U.S. Pat. No. 6,331,977 describes a System on a chip (SOC) that contains a crossbar switch between several functional I/Os internal to the chip and number of external connection pins, where the number of pins is less than the number of internal I/Os.

U.S. Pat. No. 6,262,594 describes an apparatus and method implementing a crossbar switch for configurable use of group of pads of a system on chip.

U.S. Pat. No. 6,038,630 describes an apparatus and method implementing a crossbar switch for providing shared access control device for integrated system with multiple functional units accessing external structures over multiple data buses.

U.S. Patent application No. US2002/0184419 describes an ASIC which enables use of different components for a system on a chip using a common bus system and describes wrappers for functional units with different speed and data width to achieve compatibility with a common bus.

U.S. Patent application No. US2002/0176402 describes an octagonal interconnection network for linking functional units on a SoC. The functional units on the interconnection network are organized as a ring and use several crossing data links coupling halfway components.

U.S. Patent application No. US2001/0042147 describes a system resource router for SOC interconnection, comprising two channel sockets with connect each data cache (D-cache) and instruction (I-cache). Also included are external data transfer initiators, two internal M-channel buses, and an M-channel controller to provide the interconnection.

U.S. Patent application No. US2002/0172197 describes a communication system connecting multiple transmitting and receiving devices via a crossbar switch embedded on a chip in a point-to-point fashion.

U.S. Patent application No. US2001/0047465 describes several variations of an invention providing a scalable architecture for a communication system (typically a SOC or ASIC) for minimizing total gates by dividing transmissions into individual transmission tasks, determining a computational complexity for each transmission task and computational complexity being based on the number of MIPS per circuit.

In the reference entitled "On-Chip Interconnects for Next Generation System-on-Chips" by A. Brinkmann, J. C. Niemann, I. Hehemann, D. Langen, M. Porrmann, and U. Ruckert, Conf. Proceedings of ASIC2003, Sep. 26-27, 2003, Rochester, N.Y., there is described an SoC architecture utilizing active switch boxes to connect processor cells for enabling packet network communications. This paper makes no mention or description of a processor core with multithreading capability.

In the reference entitled "A Comparison of Five Different Multiprocessor SoC Bus Architectures" by Kyeong Keol Ryu, Eung Shin, and Vincent J. Mooney, Conf. proceedings of Euromicro Symposium on Digital System Design (DSS 01), Sep. 4-06, 2001, Warsaw, Poland, there is described Multiprocessor SoC bus architectures including Global Bus I Architecture (GBIA), Global Bus II Architecture (GBIIA), Bi-FIFO Bus Architecture (BFBA), Crossbar Switch Bus Aichitecture (CSBA), and CoreConnect Bus Architecture (CCBA).

The approaches based on a single embedded processor provide a cost-effective, integrated solution to some applications but may lack the computational power required by more demanding Applications, and flexibility for protocol conversion or future protocol speed increases, for example 2.5 Gbps Fibre Channel to 10 Gbps Fibre Channel.

Within the last few years, the computational capabilities of the SoC of FIG. 1 have been enhanced, in a number of networking applications, through the addition of special-purpose processor cores (accelerators) 39 attached to the common bus(PLB), as shown in FIG. 2, operating in parallel with the processor core 25). These additional special-purpose processor cores 39a, 39b, etc. are usually small in silicon area, as many of the features found in typical general-purpose processors (e.g., a memory management unit to support virtual addressing, etc.) are excluded. Examples of this approach are IBM's PowerNP (See for example, the reference entitled "IBM Power Network processor architecture," Proceedings of Hot Chips 12, Palo Alto, Calif., USA, Aug. 2000, IEEE Computer Society by M. Heddes, and NEC's TCP/IP offload engine, (See for example, the reference entitled "NEC's New TCP/IP Offload Engine Powered by 10 Tensilica Xtensa Processor Cores," at http://www.tensilica.com/html/pr_2003_05_12.html). Although these systems are programmable and, consequently, more flexible compared to hardwired accelerators, they suffer from several drawbacks: a) they induce additional traffic on the SoC bus (e.g., PLB 21), as the bus must now support both instruction and data streams to the processor accelerators possibly causing bandwidth contention and limiting system performance; b) the SoC bus is often not optimized for multiprocessor performance but for compatibility with standardized components and connection protocols in a SoC system; and, c) the processor accelerators 39 often implement only a very limited instruction set and use assembler language, thus making the development and maintenance of applications running on the processor accelerators very difficult and costly.

A third type of SoC design 75 is an embedded processor core connected via a crossbar switch, such as Motorola's MPC 5554 Microcontroller (Design News, Nov. 3, 2003 page #38) a block diagram of which is depicted in FIG. 3. As illustrated in FIG. 3, Motorola's SoC design consists of many similar elements as the SoC designs of FIGS. 1 and 2 including a PowerPC processor core, memory and bus interfaces, however, more notably, implements a 3×5 Crossbar switch 72 as a replacement for one of the local buses. By incorporating a crossbar switch 72 into the SoC design, the processor core communications may occur faster, with three (3) lines working simultaneously, thereby addressing the bandwidth contention problems to some degree. However, the SoC is still not optimized for multiprocessor support, or more advanced functions like protocol conversion within a single SoC chip, or high speed interfaces. The I/O communication within the chip is limited by the crossbar switch, and still requires communication with the external bus interface and host system bus, limiting performance and flexibility of the micro controller (SoC chip) for any future upgrades. Any protocol conversion would be required to be performed off-chip, in several stages, or chips. In addition, a data packet can not be decoupled from instructions placed onto the host system bus. In the example in FIG. 3, one protocol, for example, the FlexCan (CAN protocol: "Control Area Network) data stream typical used in automotive applications, is now being implemented in the Motorola MPC5554 chip via an external I/O bridge 78, as well as other protocols such as the DSPI (or "Serial Perphical Interface"), or eSCI ("Enhanced Serial Communication Interface'), each protocol or I/O specific stream passes through an I/O bridge, crossbar switch, and typically either an internal chip bus, or external bus interface to the system bus.

Currently, there is no protocol conversion today within a single chip and no means for protocol conversion with an embedded core, attached to the internal chip bus, from one independent protocol or protocol version level to an entire new protocol or version level.

Current protocol conversion only takes place at the system, or card level, involving multiple chips as mentioned earlier, one example is the Brocade Silkworm Fabric Application Server mentioned earlier for SAN networks (See, for example, http://www.brocade.com/san/extending_valueof_SANs.jsp) as shown in FIG. 4.

In the prior art Brocade system 100 depicted conceptually in FIG. 4, for example, Fibre Channel-to-Fibre Channel (FC-to-FC) Routing 102, iSCSI-to-FC bridging 104 and Fibre Channel to FC-IP translation 110 capability is provided. Brocade's design is an improvement over the existing art today, in that one fiber I/O port card can support multiple protocols and even migrate from one protocol to another on the same I/O card without disturbing traffic on the other ports within a system. This is accomplished by splitting the data and control frames in the processing function of packets, several in-line RISC processor chips with local memory and frame buffers, software pre-processors, and translations engines within the processor card. This is an improvement over standard single HBA cards, allowing two network protocols within a single HBA card, eliminating cost and space, flexibility of changing protocols without disturbing traffic on the main system bus, data transfer overhead and memory contention on the main system processor memory. The multiprocessors in Brocade's approach are fully pipelined, attached to local memory.

It would be highly desirable to incorporate this functionality within a single chip as opposed to a single HBA card or bridge card, enabling true protocol conversion within a single chip, processing the data and control frames within the protocol converter to deliver a complete packet to a local SoC bus, or system bus. This would enable further potential reduction of I/O cards, savings in hardware (number of chips), less bandwidth contention, memory contention, and enable higher protocol speeds, and more processors within a SoC chip (or attached to a local system bus), and higher throughput.

SUMMARY OF THE INVENTION

It is an object of the present invention to provide a self-contained protocol converter on a single chip or as embedded as an SoC macro that performs protocol conversion processing entirely within the single chip or embedded macro implementation without requiring the resources of a host system.

According to one aspect of the present invention, there is provided an effective protocol converter on a single semiconductor chip or as a single chip embedded protocol converter macro for use in SoC type design, the single chip or embedded SoC macro implementation capable of converting one communication protocol to a separate, new communication protocol, and/or capable of converting one communication protocol version level to another communication protocol version level. For example, the SoC embedded protocol converter macro or single chip protocol converter are configurable for converting packets from one protocol version level, e.g., Fibre Channel 2 Gb/s to another e.g., Fibre Channel 10 Gb/s, or conversion from one protocol to a completely different protocol (e.g.—Fibre Channel to Ethernet or iSCSI, etc.) within the single chip or embedded SoC macro.

Whether implemented as a single chip or as an embedded macro, the protocol converter comprises one or more processor core assemblies, each comprising two or more microprocessor devices capable of performing operations to implement protocol conversion capability; a local storage device associated with said two or more microprocessor devices for storing at least one of data and instructions in each processor core assembly; one or more configurable interface devices enabling receipt and transmission of communications packets according to one or more communications protocols; and an interconnect means for enabling communication between said two or more microprocessor devices and the interface devices. Thus, advantageously, the single ship protocol converter and embedded macro design includes a means to scale SoC type designs to much higher protocol speeds, and includes the capability of incorporating a larger number of processors within an SoC implementation.

The single chip or embedded protocol converter functionality may be realized by utilizing a fully pipelined, multi-threading, multi-processor chip design where local memory is incorporated within the chip (or as a SoC attached macro) to handle all functions of protocol conversion (resizing, reformatting, control, partitioning) to deliver a complete packet to a local bus.

Preferably, the single ship protocol converter and embedded macro design performs most of the protocol processing without requiring the resources of a host system bus (i.e., processing takes place in the SoC attached macro), i.e., any protocol converted packets are subsequently placed on a local SoC or system bus when needed. Protocol processing instructions are executed entirely within the SoC protocol macro or protocol conversion chip for stand-alone designs. Improved bus performance, system bandwidth, increased number of protocols within a system, and significant reduction or elimination of host bus attachment cards can be achieved.

Because of the single chip embedded macro, main system daughter cards typically employed in protocol conversion applications, are eliminated, thus lowering costs and increasing performance.

Furthermore, the SoC embedded protocol converter macro or single chip protocol converter architecture is easily re-configurable from one function (i.e., Protocol conversion) to a completely new function (TCP/IP offload, Accelerator, Firewall function, etc.). Thus, the operating function of the single chip or embedded protocol converter macro may be modified to an entirely new operating function, separate and unique from a first operating function for which it may have been initially programmed. This operating function change may be based on factors including, but not limited to: a number of processor core assemblies (processor clusters) in the chip, the number of processors within the clusters, an amount of local memory (e.g., instruction cache memory within the clusters and an amount of local memory (SRAM, DRAM, etc) associated with each cluster.

According to a further embodiment, the single chip protocol converter integrated circuit (IC) or SoC protocol conversion macro core implementation utilizes a multi-threading, pipeline, multi-processor core embedded with sufficient local memory, control logic, collect and work queues, a crossbar switch or other switching subsystem, protocol control, interfaces, and bus bridge I/O functions in a single chip design. By incorporating a standard bus bridge I/O function to an System-on-Chip (SoC) local bus, an embedded protocol converter macro is additionally realized for higher density, efficiency, improved host processor performance, bandwidth, and memory contention improvements, overhead reductions. In a multi-threading approach, pipelining, with a small number of instructions, a simple processor structure, embedded memory, and contexts that do not run to deep in the processors, the protocol converter chip or embedded macro may be made highly adaptable, and re-configurable to multiple protocols, version levels, and even separate networking functions than the original protocol converter chip or embedded SoC macro was intended for initially.

Advantageously, the SoC embedded protocol converter macro or single chip protocol converter of the invention apply to many applications from SAN networks, Servers, Home networks, Automobile networks, Industrial, and Telecommunications to simple I/O protocol data streams.

BRIEF DESCRIPTION OF THE DRAWINGS

Further features, aspects and advantages of the apparatus and methods of the present invention will become better understood with regard to the following description, appended claims, and the accompanying drawings where:

DETAILED DESCRIPTION OF THE PREFERRED EMBODIMENT

As will be referred to herein, the term "Protocols" refers to any specific Input/Output (I/O) communication data physical layer stream, typically specified by a standards body, or could be a company internal proprietary interface, with examples including, but not limited to: Fibre Channel, Gigabit Ethernet, iSCSI, IP, TCP/IP, FC-IP, ESCON, FCON, CAN, SAMBA, DSL, VoIP, MPLS, GMPLS, and many more.

In the described embodiments, the protocol is a communication protocol such as Fibre Channel, Ethernet, iSCSI, ESCON, FCON, IP, layered, or encapsulated protocols such as FC-IP, IP/MPLS, etc. A data communications protocol typically has data bits arranged in bytes, words or sets, frames, and packets, with control characters such as the start of frame, end of frame, source, destination, etc., as well as the actual data in the payload of the bit stream.

The protocol converter of the present invention employs a special processor and is implemented as either a standalone or integrated in a SoC (system on a chip) type design. A block diagram of the base protocol converter chip 350, which may be utilized as a macro for SoC implementations, is illustrated in FIG. 5.

The basic structure and operation, of this core is described in herein incorporated, commonly-owned, co-pending related U.S. patent application Ser. No. 10/604,491 entitled "Self-Contained Processor subsystem as component for System-on-Chip design", filed Jul. 25, 2003, the operation of which is now described herein.

Figure 5:
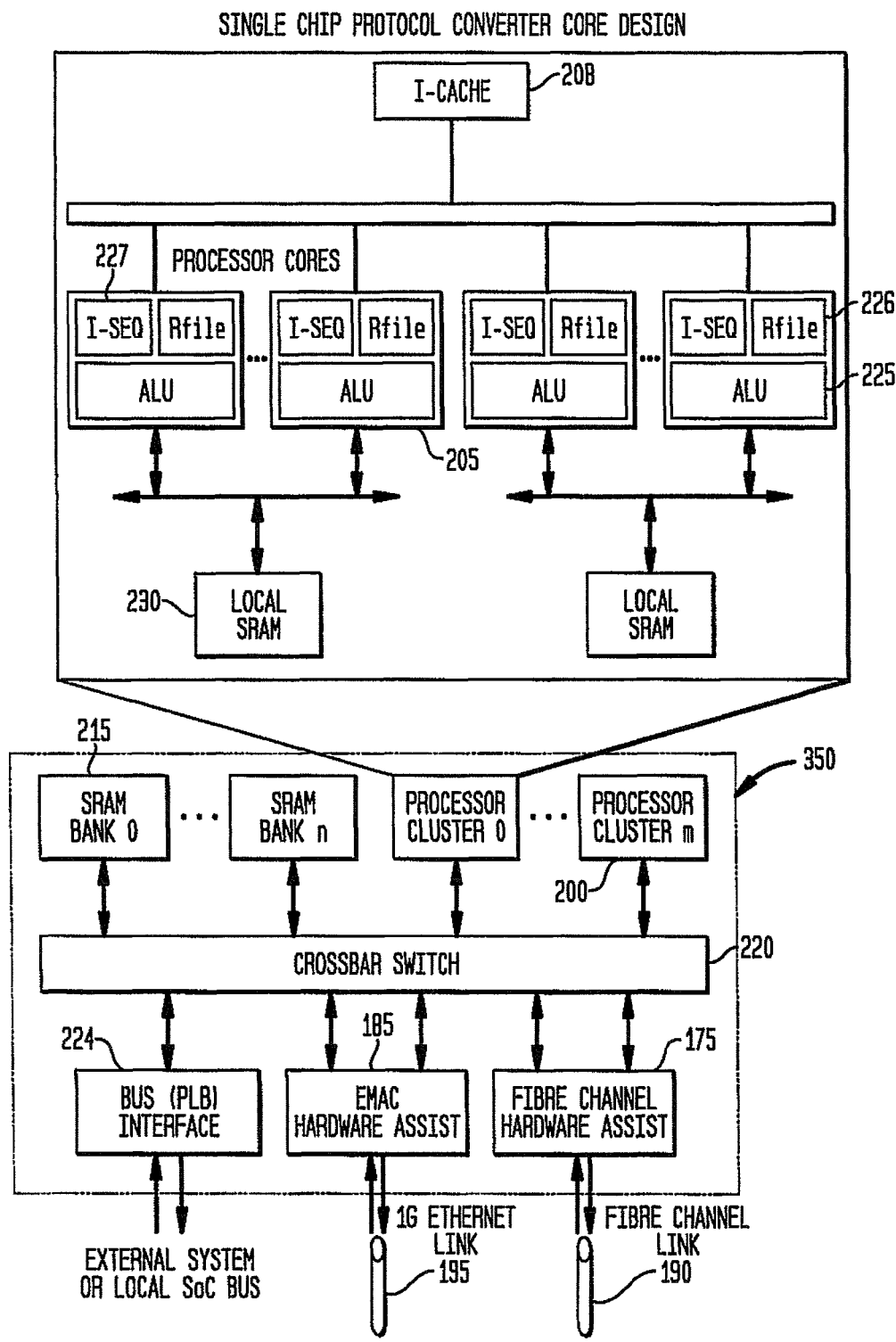
FIG. 5 depicts an exemplary overview of a Single Chip Protocol Converter Core Design according to one embodiment of the invention.

Briefly, as shown in FIG. 5, the protocol converter on a single chip (or as an SoC embedded macro core), is a self-contained processor-based subsystem 350 dedicated for protocol conversion, but re-configurable to other network functions, comprising one or multiple processor clusters 200, one or more local memory banks 215 for storing data and/or instructions, and a local interconnect means 220, implemented as a crossbar switch (or, alternatively, a fabric switch, or MP bus could be utilized) or other like switching means. The single chip protocol converter design of the invention comprises many simple processor cores with a reduced general purpose instruction set derived from the PowerPC architecture.

Each processor cluster 200 comprises one or more processing cores 205, each of which is a single-issue architecture with a four stages deep pipeline, with each processor core 205 having its own register file 226, Arithmetic Logic Unit (ALU) 225, and instruction sequencer 227. In the embodiment of the single chip protocol converter depicted in FIG. 5 and the SoC embedded macro for protocol conversion depicted in FIG. 8, eight processor cores 205 are packed in a processor cluster 200 together with an instruction cache 208. The size of the instruction cache is a design option, e.g., 32 kB, which is sufficient for network applications. A local SRAM memory unit 230 associated with at least two processor cores 205 via a local bus is additionally provided. The exact number of processor clusters 200 in the protocol converter 350 needed to support sufficient computation power, e.g. one, two, or even 16 processor clusters (comprising 128 cores), depends on the application requirements. For example, implementing functionality for Fibre Channel network protocol requires less computational power than the more complex TCP/IP termination, IP, or for iSCSI protocol conversion implementations.

Another feature of the processor-based subsystem protocol converter 350 of the invention is the use of embedded memory 215 for storing the application program, current control information, and data used by the application. Sufficient amounts of memory to provide smooth operation under normal operating conditions are placed in the protocol converter without excessively increasing its size. A further advantage of embedded memory, as compared to conventional off-chip memory, is that it offers short and predictable access times, which are accurately accounted for in the time budget estimates for the processing of packets.

All elements in the protocol converter chip 350 are interconnected via the crossbar switch 220 which specifically interconnects processor clusters 200, shared memory blocks 215, and network protocol layer hardware assist devices or embedded MAC interfaces 175, 185. When implemented as an embedded macro in an SoC (such as described herein with respect to FIGS. 8-10), the crossbar switch 220 is, in turn, connected to an SoC processor local bus 210 or external system bus 223 (for example, a PCI or PCI-X, etc.) by means of a bridge macro (bus) 224 or, directly attached. The bridge can be adapted to accommodate different speeds, bus widths, signals, and signaling protocols. In the macro SoC implementation, the advantage of a standard interface between the protocol converter macro 350 and the embedded processor local bus 210 (e.g., PLB in IBM's CoreConnect or ARM in ARMBA, MIPs, etc.) is that it allows the integration of the protocol converter as a macro in a SoC component library.

Further implemented for highly time-critical functions at the lower level of the network protocol are hardware accelerators that handle low-level protocol tasks, such as data encoding/decoding, serialization/deserialization, link management, and CRC and checksum calculation. These tasks are performed on every byte of the transferred packets and would be very computation expensive if implemented in software. The hardware implementation of these functions are thus provided as hardware accelerators implemented in network interfaces 175 for Fibre Channel and Gigabit Ethernet 185, each requiring only a small silicon area and interfacing with respective Fibre Channel and Gigabit Ethernet communication links 190, 195, respectively.

Additional advantages resulting from the separation of the protocol converter core 350 and the processor buses (SoC processor local bus or the system bus in single chip implementations) are: 1). The only traffic between the protocol core and the SoC system or system bus is the data flow traffic (data receive and send), thus minimizing bandwidth contention; and, 2). The subsystem interconnect fabric (i.e., switch) provides an optimized high-performance solution to the protocol core, without the need to accommodate the standard component interfaces and connection protocols of the overall SoC, other processors attached to the switch fabric, or the main system bus itself, allowing for higher protocol conversion speeds, more protocols handled within a single SoC or Host Bus Adapter Card, and less contention on the main system bus.

The operation of the processor subsystem when implemented as a protocol converter (either standalone single chip or as an embedded SoC macro) is now described. In one embodiment, the single chip protocol converter 350 (or embedded macro for SoC design) provides Fibre Channel (FC) to Gigabit Ethernet (GE) conversion. It is understood that the design allows for many combinations such as Fibre Channel to IP, Fibre Channel to iSCSI, Fibre Channel to Infiniband, TCP/IP to iSCSI, and any of the other protocols mentioned herein. In fact the implementation is not restricted to only data communication protocols, but could be implemented in automobile networks, home, or industrial environments, such as similar to the Motorola MPC5554 Microcontroller for automobile networks such as CAN or the SAMBA network for home applications.

Figure 6:
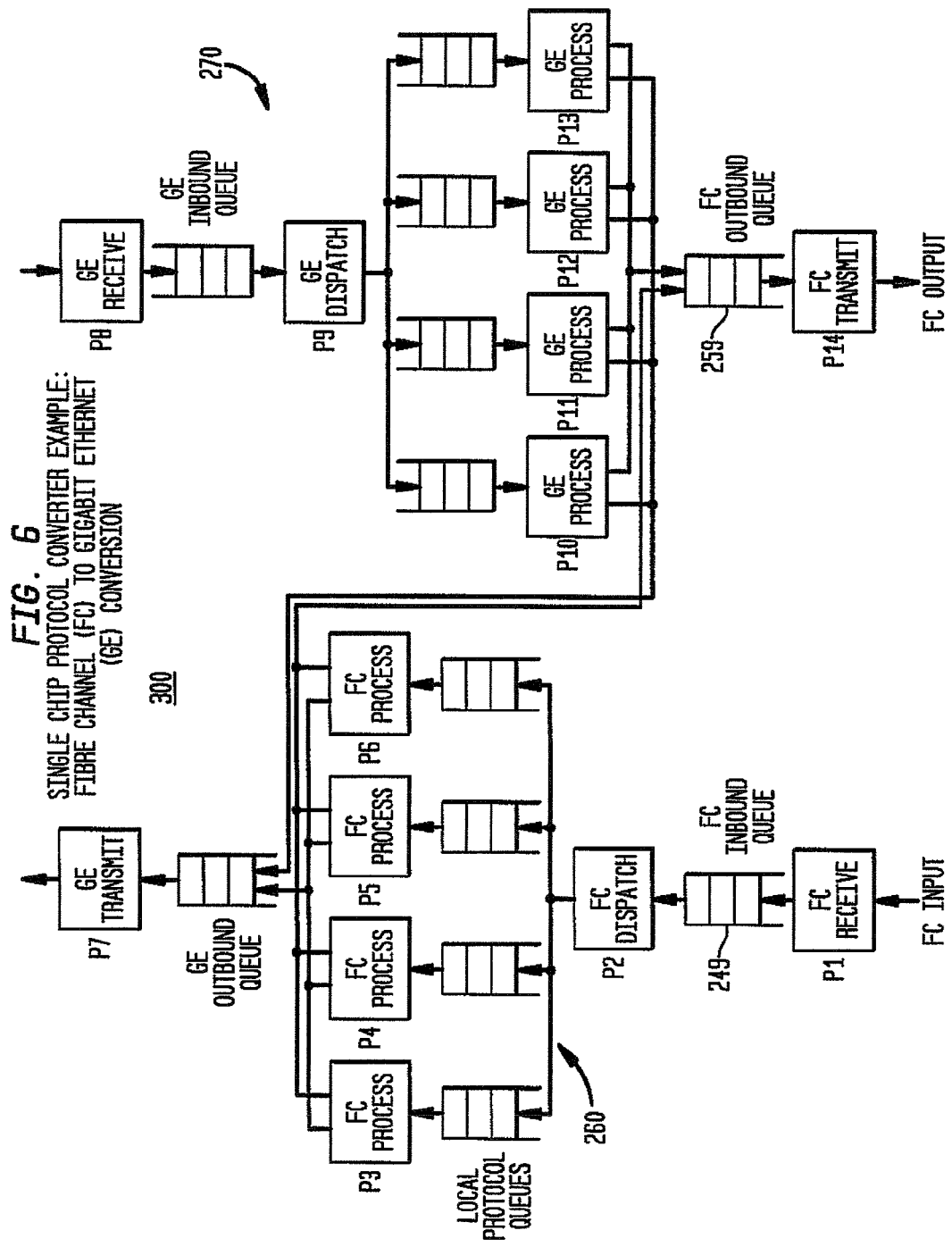
FIG. 6 is an exemplary illustration of the protocol core configured as a Fibre Channel to Gigabit Ethernet single chip protocol converter according to one embodiment of the invention.

FIG. 6 is an exemplary illustration of the single chip protocol core 350 of FIG. 5 configured as a Fibre Channel to Gigabit Ethernet single chip protocol converter 300.

In the protocol core shown in FIG. 6, there is implemented the required endpoint functionality, as well as the packet resizing and reformatting needed for conversion between the two protocols. The basis for this implementation is the partitioning of the protocol operations so that they can be handled by different resources on the chip. Each protocol operation to a processor (or a group of processors), except for some time-critical functions close to the network physical interfaces that are implemented, by means of hardware accelerators. The packet and processing flow is now described with respect to FIG. 6 as follows: The received packet and some status information are transferred from the inbound FIFO buffer to embedded memory by DMA logic that has already received a pointer to an empty memory area from a list of free buffers. The packet header is examined to determine the packet context and to switch current context, if necessary, by obtaining control information from memory or by generating new control information in case the packet is the first one of a new exchange. In addition, the received packet is validated to ensure that it complies with the class of service of the exchange it belongs to. If an acknowledgment for the received packet is required to be sent back to the source, (e.g., class 2 service in Fibre Channel), an acknowledgment packet is generated. The corresponding header information for the acknowledgment packet is assembled, and the packet is sent to the outbound Fibre Channel network interface. A packet is defined in this specification as a collection of data bits, containing at least destination information, and typically, for a communications packet, a header as well.

In the meantime, a Gigabit Ethernet packet header is generated for the received packet, and the packet is resized according to the Ethernet network protocol. The newly formed packet (or packets) is transferred to the outbound FIFO buffer in the Ethernet (EMAC) network interface hardware module 185. Similar tasks take place for performing the opposite protocol conversion, i.e., transferring packets from the Ethernet to the Fibre Channel network. The logical representation of this prototype single chip Fibre Channel/Ethernet protocol converter implementation 300 is illustrated in FIG. 6. This example implementation uses 14 processors, with those operating on the Fibre Channel (FC) to Ethernet conversion depicted in the processing block 260 shown in FIG. 6 where FC input packets are received at the processor P1, while the reverse conversion process is depicted in the processing block 270 in FIG. 6.

The assignment of protocol tasks to hardware resources is performed in accordance with the process flow depicted in FIG. 6 as follows: Processor P1 takes care of the Fibre Channel inbound DMA setup and target memory area assignment; processor P2 dispatches packets to one of the four processors P3-P6, based on the packet header information, that perform context switching, packet validation, and acknowledgment packet generation if required; processor P7 performs Ethernet header generation, setting up of the data transfer to the Ethernet outbound network interface, and returns memory area blocks that are no longer needed to the linked list of free buffers. Similarly, the packet flow from the Ethernet network to the Fibre Channel network is handled by processors P8-P14 as depicted in FIG. 6. Pointers to the packets to be transmitted to the Ethernet network are placed in a work queue 249, and pointers to packets which are to be sent on Fibre Channel are placed on the Fibre Channel outbound work queue 259.

Other network protocols, or protocol conversions, can be easily implemented in a similar fashion. For example, in implementing the iSCSI or TCP/IP protocol stack, the existing code for uniprocessor implementations can be reused, requiring only a modest programming effort to adapt it to the architecture. More specifically, the tasks of packet dispatching and collecting (processors labeled P2 and P7 for the receiving path, and P9 and P14 for the transmitting path, respectively) have to be implemented, but the network protocol is adapted to run almost unchanged in parallel, on processors labeled P3 to P6 and P10 to P13. The number of processors running protocol tasks in parallel has to be scaled according to task complexity to meet the timing requirements. For instance, iSCSI protocol conversion might require more than 14 processors in the example depicted in FIG. 6 for performing single chip protocol conversion.

Packet processing on multiple processor cores is performed either by following a run-to-completion approach, in which a packet is assigned to a single processor that carries out all processing operations, or via pipelining, whereby the packet processing operations are partitioned into multiple pipeline stages that are assigned to separate processors. In one implementation described herein, a pipelined approach provides better utilization of the hardware resources, such as, for example, I-caches. Examples of network operations that can be assigned to separate pipeline stages are header handling, packet validation, generation of an acknowledgment response, packet reordering and message assembly, and end-to-end control.

Figure 7:
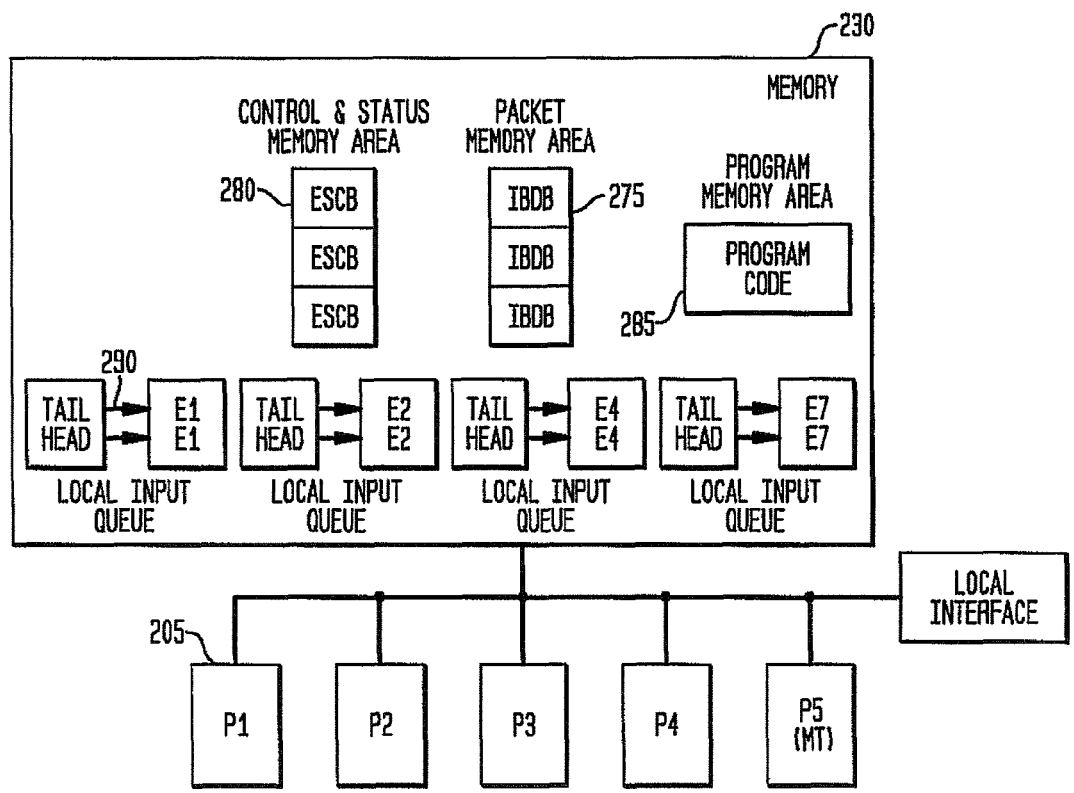
FIG. 7 depicts an exemplary Memory Allocation within the single chip protocol converter according to one embodiment of the invention.

The scheduling of protocol tasks to processors is performed statically during initialization, i.e., each processor 205 executes the same set of operations on various packets. Likewise, to avoid overhead associated with dynamic memory management, such as garbage collection, static memory management is used. All memory structures 230 used are initialized during system start-up. These include memory areas 275 for storing data packets, memory 280 for control and status information of existing network connections, program code 285, and work queues. The various memory structures used in the architecture are illustrated in FIG. 7. It is the provision of these structures that enable all sub-processes of packet protocol conversion to remain within the single chip, or as an embedded macro attached to a SoC type design, enabling a final completed packet to be delivered to the system bus or internal SoC bus.

As shown in FIG. 7, the memory area 215 that stores data packets is organized as a linked list 275. An incoming packet is stored into the next free buffer obtained from the linked list. During packet processing, only the pointer to the memory area where a packet is stored is passed between processors. When packet processing is completed, the packet is transferred to an outbound network interface, and the buffer is returned to the list of free buffers.

Processor synchronization is performed in the form of message passing via work queues 290 as further depicted in (FIG. 7). In this approach, each processor P1-P4 is associated with a work queue 290 that stores the pointers to the packets waiting to be processed by that thread. When the processor is ready to work on the next packet, it gets the pointer of the next pending packet from its work queue. When it finishes processing, it places the pointer to the packet into the work queue of the next thread in the pipeline. To ensure correct operation in memory access collisions, locking is utilized.

An important consideration in processor scheduling is that all pipeline stages may not require the same packet processing time and, furthermore, the processing time at each pipeline stage may vary depending on the packet context. For example, in Fibre Channel, packet processing time depends on whether the packet is the first, middle or the last packet in a sequence of packets, whether it carries the link control information, and whether it belongs to a solicited or unsolicited message. If one of the stages of the pipeline is significantly slower than other stages, its work queue could become overloaded, becoming a bottleneck. This is remedied by employing several processors, e.g., P1-P4 in FIG. 7 to work on the same pipeline stage in parallel.

As processing time in the pipeline stages may vary among packets, all processors may not be fully utilized. Instead, a matched throughput between pipeline stages is achieved by providing sufficient buffering and decoupling logic.

The assignment of multiple processors to work on the same task requires the introduction of a task dispatching processor (e.g., depicted as processor P5 and labeled "MT" in FIG. 7). The packet assignment method is simple so that it executes in a short processing time, and must not lead to performance degradation through resource contention and locking.

Instead, for the Fibre Channel implementation, a bin-sorting algorithm is used that results in the processing of all packets belonging to the same context group by a single processor. Information about the current context is cached in the register file of the processor, reducing resource contention and average access time for fetching this information. The sorting overhead is kept low by using a simple hash function. In one implementation, packet sorting and processor assignment tasks introduce only about 50 Instructions. However, it is understood that this may vary depending upon design choice and may range anywhere from 35-200 instructions. In the embodiment depicted, there is used as few instruction sets as possible, e.g., ranging from 35-50 instructions. There may be more active context groups than processors in typical network traffic at any given time, several different contexts may be assigned to a single processor at the same time. It is possible that, in the worst case, all packets may be assigned to only one processor causing it to overload. However, network traffic running real applications reveals that this is not a problem as the context groups are distributed evenly among the processors operating in parallel.

The architecture of the single chip protocol converter is cellular, allowing the design to be custom scaled. In the design, the number of processor cores and embedded memory blocks is easily adapted to the application requirements without making significant design changes. For example, in the following networking applications, the required computational capacity of the multiprocessor protocol converter operating at line speeds of 10 Gb/s may vary as will be described hereinbelow. Note, in this regard the protocol converter design is actually "adaptable" to other network processing functions, by the layout design, embedded memory, partitioning of network and protocol resources handled by different processes and delegated to various sub-processors, "unconstrained"—i.e. the processors are independent of a particular network function, unlike previous prior art where each processor has only one given potential functionality such as, TCP/IP offload function, Frame Classifier function, Pre-Processing function, Hardware Accelerator, RISC or Data Processing functions, etc. In the single chip protocol converter 350 of the invention, or, as an embedded macro core 550, the same processors, and local memory pairs can perform different network functions (i.e. operations), as long as enough processing power to scale the intended operation is allowed. A few examples are listed below:

Protocol conversion: 14 processors (i.e., two 8-core processor clusters). A chip that includes 64 bytes of I-cache, 64 Kbytes of data SRAM, a PowerPC440 (or other processor) and the other macros shown in FIGS. 5 and 6, would require approximately 35 mm$^2$ in 0.13 m ASIC Technology.

TCP/IP offload engine: 32 processors, i.e., four processor clusters, assuming 128 Kbytes of I-cache and 128 Kbytes of SRAM, this would occupy 50 mm$^2$ in the technology above.

Integrated firewall: 128 processors (estimate), i.e., 16 processor core clusters. Assuming 512 Kbytes of I-cache and 512 Kbytes of SRAM, the resulting chip would be about 150 mm$^2$.

The same basic architecture (one can build many more sub-processors, within the chip or as an SoC embedded macro that is needed for a given application), is adaptable as network speeds, or market conditions change. For example, the architecture is adapted to reconfigure the chip as a "Firewall Processor" or "Protocol Converter", or even entirely new designs or protocols not even implemented. Thus, one basic design is extendable to many applications and potential functions. The network function of the chip or embedded macro SoC core, can be altered without redesigning the chip, by simply selecting the number of processors, and memory units, then applying the appropriate software code or version level. The number of processors chosen and memory units for a new protocol function is chosen by statistical simulation of the cores performance for the new function intended.

Figure 8:
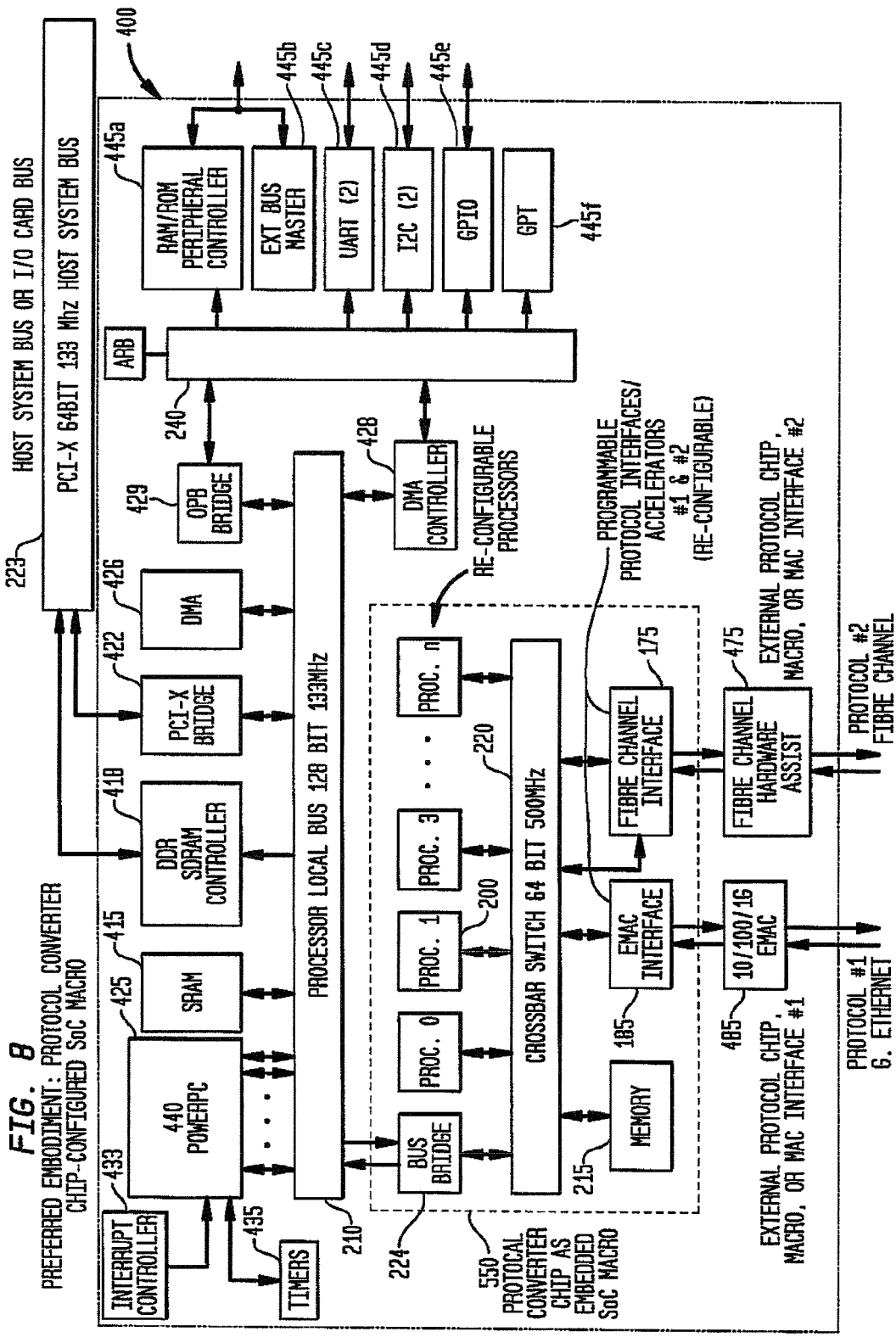
FIG. 8 depicts a Protocol Converter Chip configured as an embedded macro in a SoC design according to a second aspect of the invention.

As mentioned earlier, the Protocol Converter can be implemented as a standalone integrated circuit chip on a separate semiconductor substrate, or embedded as a macro in a SoC type design, FPGA, DSP, etc. An example of a Protocol Converter implemented as an embedded macro core in an SoC (System-On-Chip) design 400 according to a second aspect of the invention, is depicted in FIG. 8. It should be understood that the macro is not limited to SoC designs, but could also be implemented in standard DSP, micro-controllers, FPGA, ASIC's, and microprocessors, since all that is needed is a standard bus interface or bridge to deliver the completed data packet (converted or unconverted). The term "SoC" is generically used to define a system on a chip, with at least one processing element, memory elements, I/O interfaces, and cores attached to a local bus or multiple on-chip buses.

Figure 1:
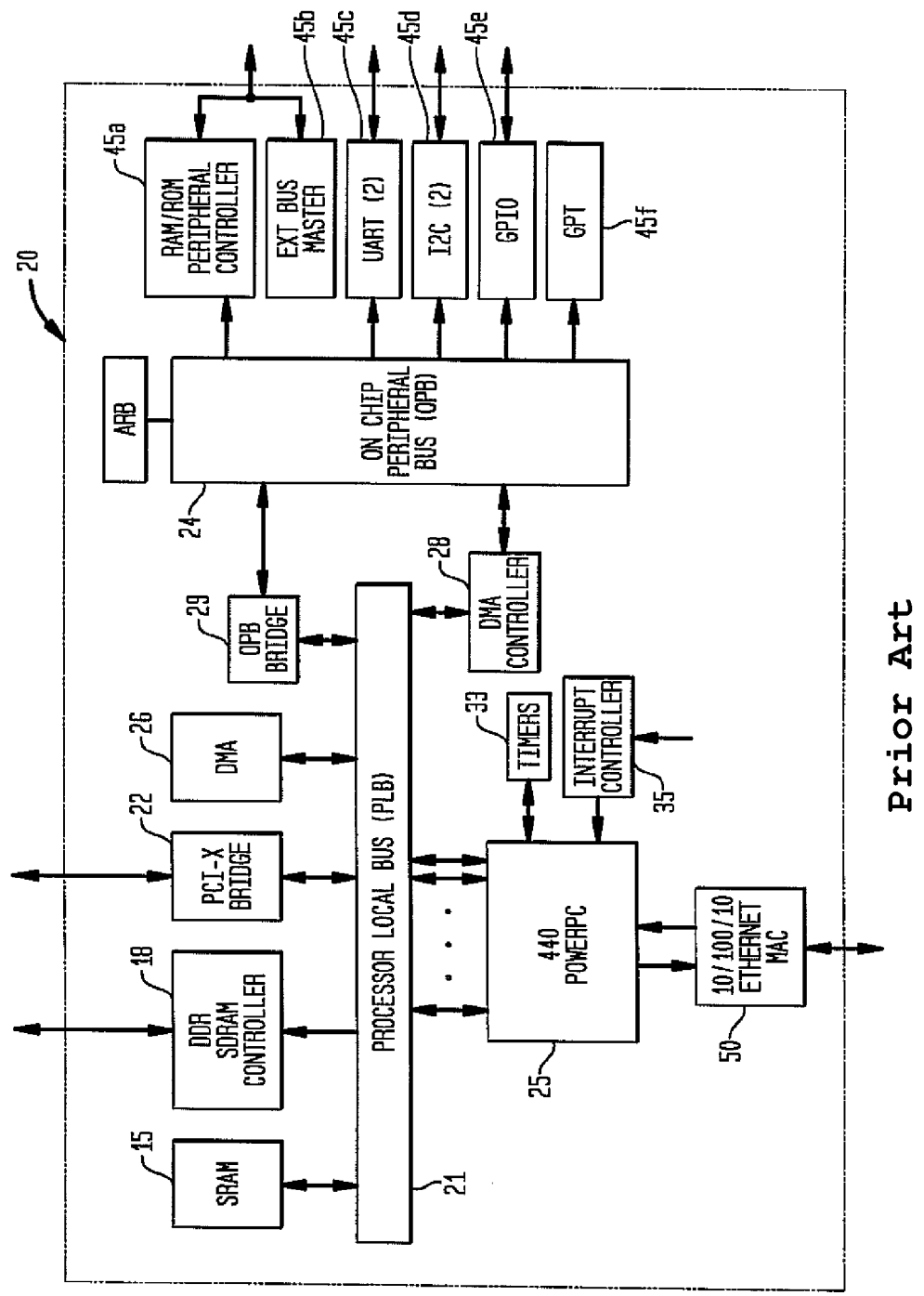
FIG. 1 is a block diagram illustrating a typical SoC on the employing a single processor according to the prior art.
Figure 2:
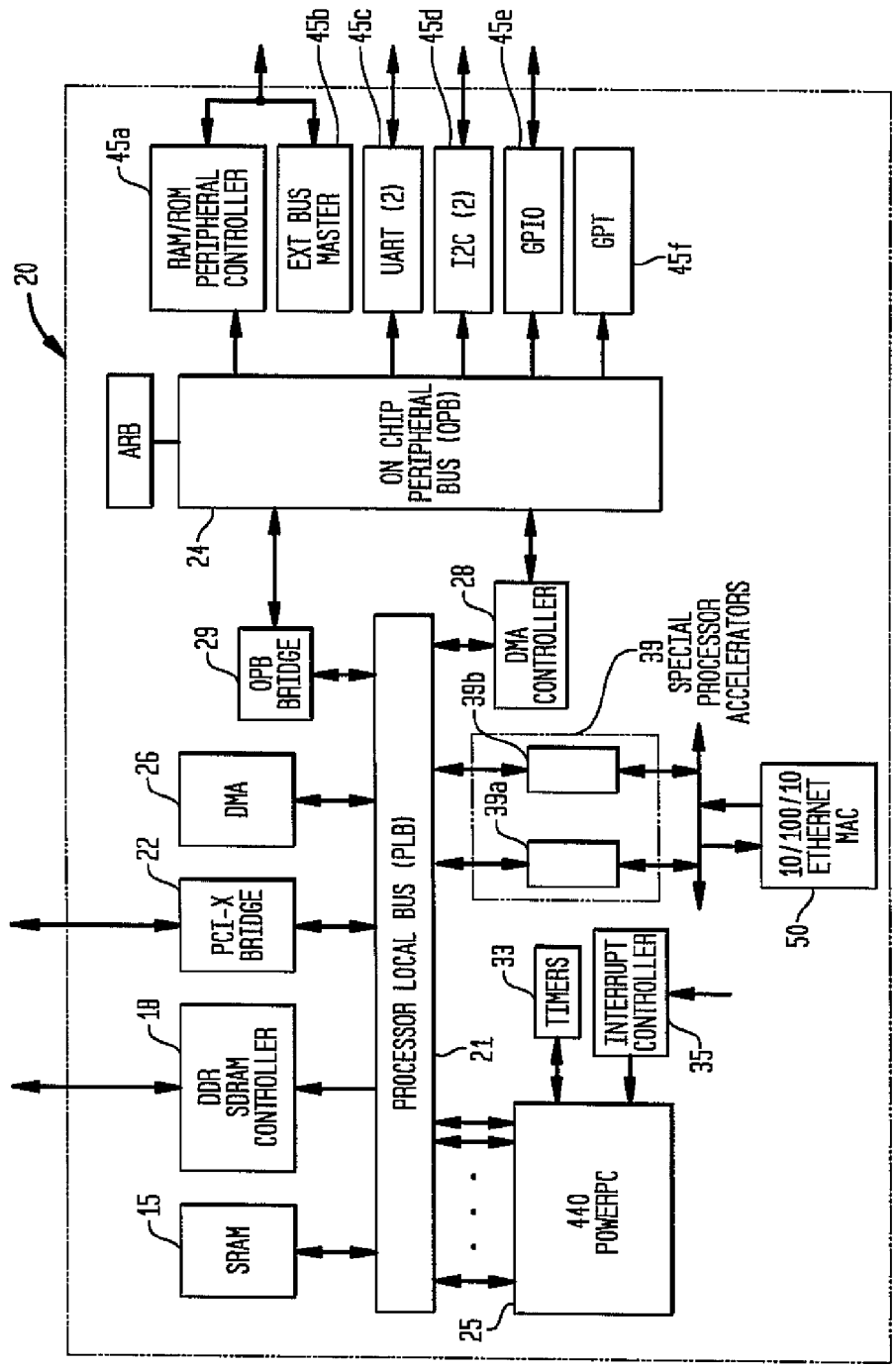
FIG. 2 is a block diagram depicting a typical SoC on the market today employing process accelerators according to the prior art.
Figure 3:
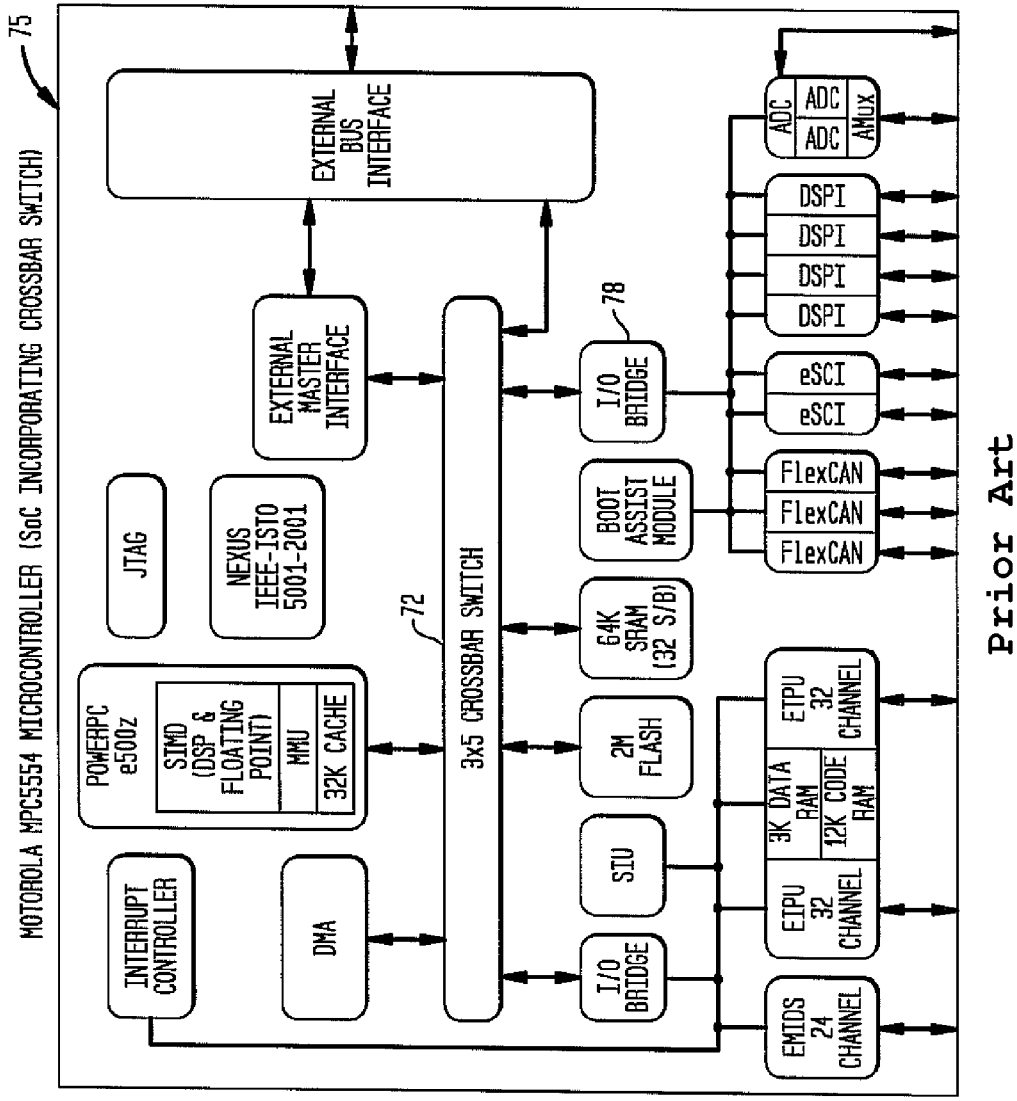
FIG. 3 is a block diagram depicting the Motorola MPC5554 Microcontroller (SoC incorporating Crossbar Switch) according to the prior art.
Figure 4:
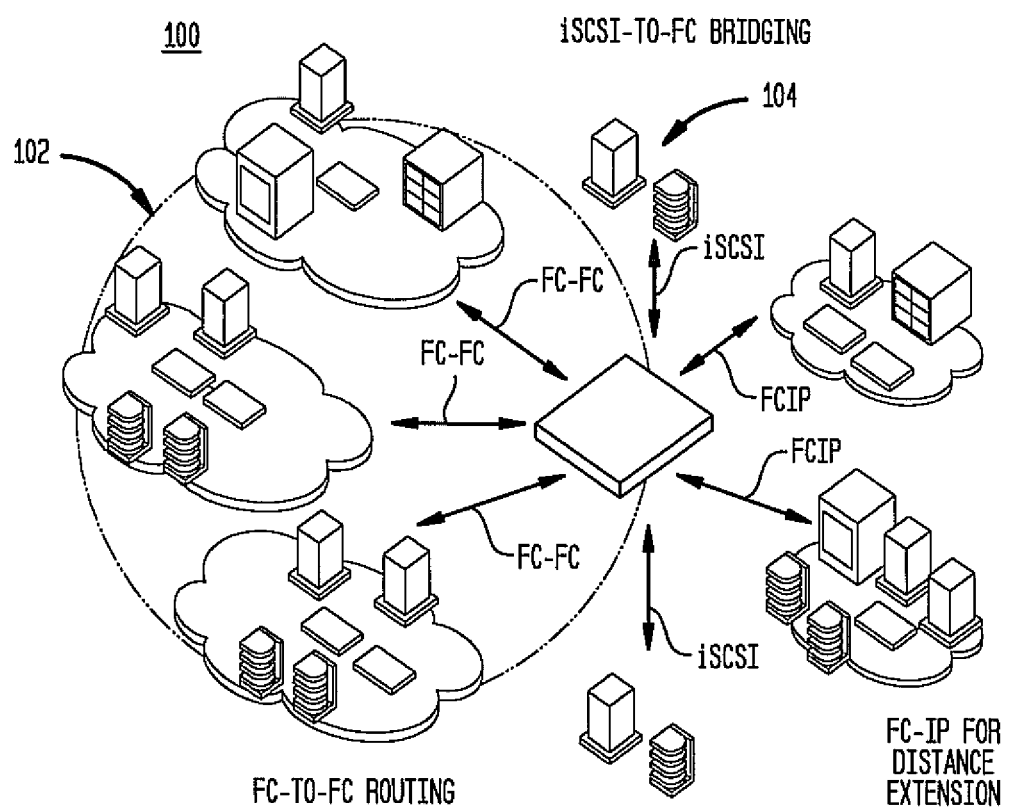
FIG. 4 is a block diagram depicting Brocade's Silkworm™ Fabric Application Server_for SAN networks according to the prior art.

As shown in FIG. 8, an embodiment of the SoC 400 including the embedded protocol converter macro core 550 (as also depicted in FIG. 5 as a stand-alone chip design) comprises a CPU or MPU element 425 (shown here as IBM's PowerPC 440 however, it is understood that other SoC processor cores, besides PowerPC, such as ARM, MIPs, and the like, may be implemented.), a local SoC bus 210 (illustrated in FIG. 8 as IBM's CoreConnect PLB 210 (Processor Local Bus)), an optional slower speed bus (illustrated in FIG. 8 as IBM's On-chip Peripheral bus or OPB 240), and any number of SoC components (cores) such as shown in FIG. 1, including an SRAM 415, DDR controller 418, PCI-X bridge 422, DMA 426 and DMA controller 428, OPB bridge 429, etc. The OPB 240 connects other devices including one or more of the following: a RAM/ROM Peripheral controller 445a, an external bus master 445b, a UART device 445c, an Inter-IC bus (12C) interface 445d, general purpose I/O interface 445e and a gateway interface 445f.

The embodiment depicted in FIG. 8 includes the self-contained, processor-based protocol converter 550 that is integrated as a single-chip protocol converter or embedded macro core in the SoC system 400 and communicates with the processor core 425 bus via the bridge 224 and PLB 210. As described, the processor-based protocol converter macro core 550 comprises one or multiple processor clusters 200, one or more local memory banks 215 for storing data and/or instructions, local interconnect means such as crossbar switch 220 in the embodiment depicted, or, equivalently, a fabric or N×X switch, and the like, and at least two Media Access Control (MAC) interface units 175, 185 (media access control) for at least two network protocols. As shown in FIG. 8, these MAC units 175, 185 interface with respective external MAC interface devices 475, 485 that may be Physical Layer Chips (PHY), a SoC embedded MAC or PHY function, or external protocol chips separate from the SoC or host card. That is, the MACs 475, 485 shown in FIG. 8 may comprise a Fibre Channel Hardware Assist core and an Ethernet 10/100/1G EMAC, however, may be include interfaces for any protocol, and be integrated off chip as a separate MAC or PHY device (physical layer chip) or, be external to the SoC chip on a local card. In slower speed applications today, such as automobile applications or home networking, this maybe desirable.

Figure 9:
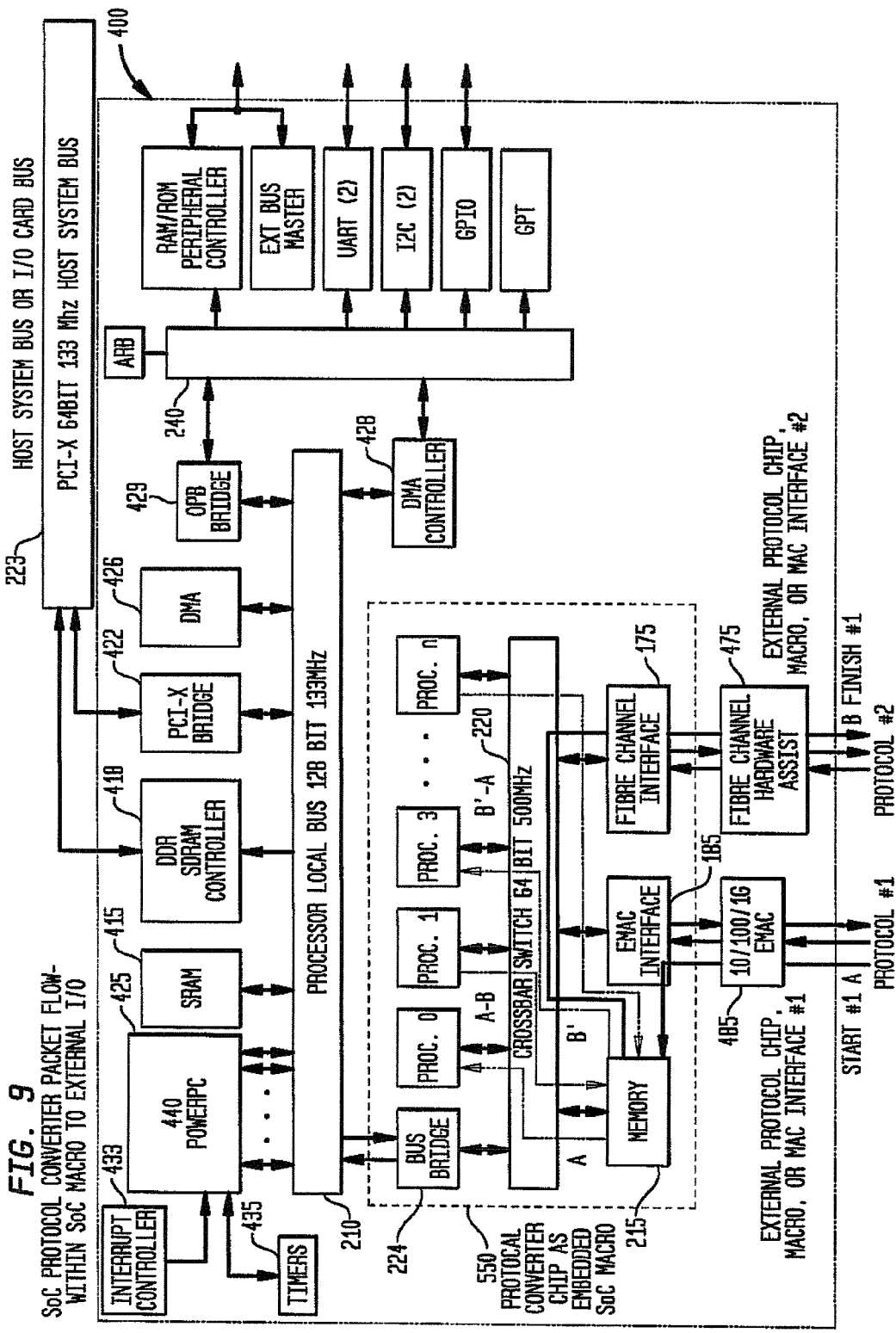
FIG. 9 depicts the SoC Protocol Converter packet flow within the SoC Macro to External I/O for the system of FIG. 8 according to the invention; and, FIG. 10 depicts an exemplary SoC Protocol Converter packet flow from a Host Bus to SoC device external packet delivery interface according to the invention.

FIG. 9 illustrates a process flow for protocol conversion of a single packet within the embedded SoC to external protocol interfaces. As the local memory within the macro controls both processing and DMA transfer of the packets, the packets can be transferred after protocol conversion out of the macro from the first interface to the second I/O interface or, output to the local SoC bus 210 and finally to the host system bus 223 (for example, a PCI-X 133 MHz as depicted in FIG. 9 or, like equivalent). Preferably, communication is duplex, i.e., includes links enabling communication in both send and receive directions. By way of example depicted in FIG. 9, A to B packet conversion is shown with a packet according to a first protocol, e.g., where 1G Ethernet packets are received at the SoC external protocol chip, macro or EMAC (external Ethernet I/O) interface 485 and are forwarded to the converter macro's EMAC 185 internal FIFO into the macro's internal memory 215 over the crossbar switch 220. The macro's internal memory (SRAM, DRAM, etc.) by means of work cues, collects the Ethernet packets, and an on-chip controller function transfers the Ethernet packet via the crossbar switch to sub-processors, for example, of "proc. 1" cluster as shown in FIG. 9. It should be understood that, as described herein, due to the parallelism, pipelining, and multithreading, the process of protocol conversion is broken down evenly among several sub-processors within the embedded protocol converter macro core 550 for protocol conversion, and several conversion processes are matched with one processor. Thus, even through only one round, e.g., "A" going to "B" from "proc. 1" to "proc. 3" is depicted, in actuality the packet is partitioned among several processors for conversion. While protocol A to B packet conversion is depicted in FIG. 9, the alternative process would comprise having protocol B' packets entering on the other side of "B Finish" and exiting on Protocol #1 (A-side). It is understood that B' and A' process flow would be on the other side of the two-way duplex link.

The actual protocol conversion code is performed on the processing elements included in the embedded protocol converter macro core 550. The macro has several processes P0, P1 . . . Pn running in parallel—one set for each direction (i.e., receive and transmit). Each of these processes is mapped to one of the macro's processing elements labeled Proc. 0, Proc. 1, Proc. 2, etc. Three different kinds of processes are provided to run on the embedded SoC macro's processors in the described embodiments including:

1. Dispatch: A process that allocates tasks to processors
2. Protocol processing: Protocol-processing tasks
3. Collect: Sets the DMA SoC controller to transfer the packet out of the core's internal memory as well as to perform some memory management functions, after the packets have been transferred.

Communication between these processes is accomplished via work queues that are basically dedicated areas in memory such as depicted in FIG. 7. An idle process determines whether it has any pending work by periodically polling its work queues.

The protocol macro core implements all the specific protocol tasks required, such as partitioning of the data into a series of IP packets, generation of IP packet headers, generation of Ethernet packets, etc., and moves the packets back to the Ethernet MAC macro. If there is a need to retransmit packets, as defined by the protocol, this takes place without interference from the SoC local processor, only packet/data transfer requests or actual data transfer is needed by external DMA or DDR memory. After protocol conversion of packet "A" to "B", the packet is transferred back to the local on-chip macro memory, and an end of data is signal. From there, the local macro memory and an embedded local DMA controller transfers the converted packet through the cross bar switch, Fibre Channel Interface, and finally external I/O interface. Alternatively, the Fibre Channel Interface could have an embedded controller to transmit the final converted packet.

The external SoC DDR 418 or DMA 426 may additionally request the packet to be delivered to the local SoC bus via the bus bridge and finally onto the host system bus 223 if needed, versus sending the packet from the protocol converter interfaces. Likewise, the host bus 223 may send a packet or packets for protocol conversion to the macro and receive a complete packet converted back or transfer to either external protocol interfaces 475, 485 depending on the respective protocol and packet type.

Figure 10:
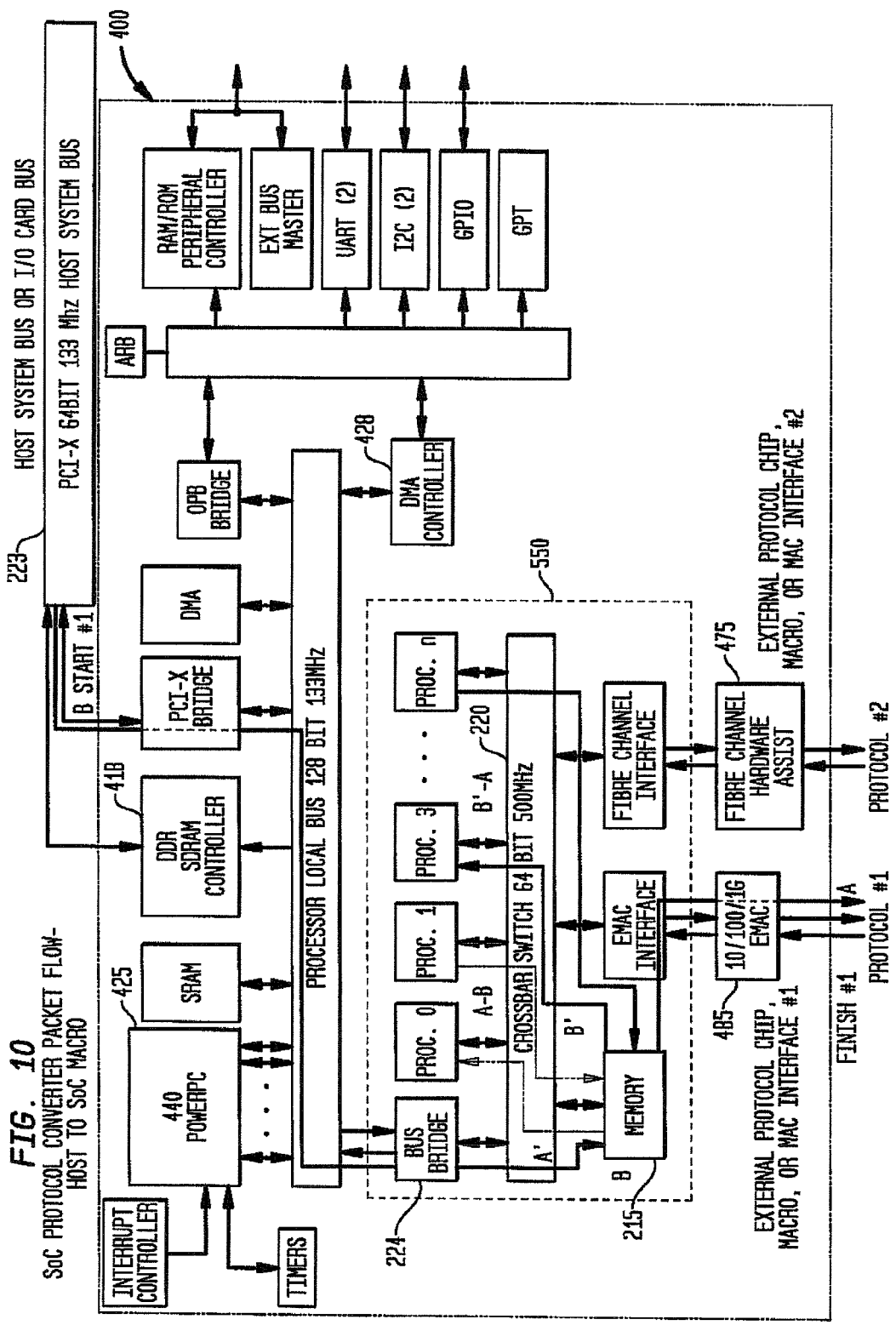

FIG. 10 illustrates an exemplary process flow for protocol conversion of a single packet received from the Host Bus 223 and delivered to the External SoC interface 485 for transmission. In the example process flow illustrated in FIG. 10, a Fibre Channel protocol packet is sent (originated) from the host system bus 223 and is sent to the SoC protocol converter macro 350 for conversion and transmission to the external Ethernet interface 1G EMAC interface 485, for example. As shown in FIG. 10, the SoC main processor (PowerPC 440) sets a request for data processing and sends the request and the pointer to the data in the external DDR memory to the protocol converter macro core 550 via the bus bridge 224. In the embodiment depicted, an interrupt signal rises, but this can be implemented by writing data to a dedicated register or pre-specified memory location.

The embedded protocol converter macro core 550 recognizes the request and activates the DMA engine to transfer data from the external host or SoC local memory to the macro local memory. Data (e.g., a Packet #B) is transferred via the local SoC bus and bridge bus to the macro's local memory

215. When all the data is transmitted, the SoC processor is notified about the task completion. This may be implemented by sending an interrupt to the PowerPC440, or writing to some predefined location which is regularly polled by the PowerPC440.

By means of work queues, collect sequences, and one processor being a task dispatching processor (MT) (as shown in FIG. 7), the Fibre Channel packet (B) is transferred from the macro's local memory to multiple sub-processors by packet partitioning as described herein. Upon completion of protocol conversion, for example, from protocol "B" (Fiber Channel type) to protocol "A" (Gigabit Ethernet type), the completed packet is transferred back via the crossbar switch 220 to the local macro's memory. A local DMA request transfers Packet "A" from the macro's memory to the external Ethernet interface 485 to complete the transfer and conversion.

The herein described methods allow for a reduced number of I/O cards and chips, greatly improved flexibility, network functionality, higher density (many more processors attached to a local or host bus), higher protocol processing speeds, improved bandwidth, less memory contention, flexibility for the end system customers, ease in network design/upgrades, and greatly improved protocol conversion than exists today.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

Having thus described our invention, what we claim is new, and desire to secure by Letters Patent is:

1. A system-on-chip integrated circuit, comprising:
a network processor core; and
a reconfigurable protocol converter in communication with the network processor core, the reconfigurable protocol converter and the network processor core integrated on the system-on-chip integrated circuit, the reconfigurable protocol converter includes a plurality of processor cores and a task dispatching processor, the task dispatching processor assigns a first set of processor cores of the plurality of processor cores to perform a first network processing function during a first period of time, the task dispatching processor assigns a second set of processor cores of the plurality of processor cores different from the first set of processor cores to perform a second network processing function during a second period of time, the second set of processor cores includes a subset of the first set of processor cores, the reconfigurable protocol converter performs the first network processing function during the first time period and performs the second network processing function during the second time period subsequent to the first time period, the second network processing function is different from the first network processing function, the first network processing function includes receiving one or more first packets of a first network protocol and converting the one or more first packets into one or more second packets of a second network protocol different from the first network protocol, the task dispatching processor assigns all packets of the one or more first packets belonging to a first context group to a first processor of the first set of processor cores during the first period of time, the task dispatching processor assigns all packets of the one or more first packets belonging to a second context group to a second processor of the first set of processor cores during the first period of time, the second network processing function includes receiving one or more third packets of a third network protocol and converting the one or more third packets into one or more fourth packets of a fourth network protocol different from the third network protocol, the fourth network protocol is different from the second network protocol, the third network protocol is different from the first network protocol, the reconfigurable protocol converter includes a first interface unit, the first interface unit transmits the one or more second packets during the first time period, the first interface unit transmits the one or more fourth packets during the second time period.

2. The system-on-chip integrated circuit of claim 1, wherein:
the first interface unit is configured as an Ethernet interface unit during the first time period; and
the first interface unit is configured as a Fibre Channel interface unit during the second time period.

3. The system-on-chip integrated circuit of claim 1, wherein:
the first interface unit is configured as a Gigabit Ethernet interface unit during the first time period.

4. The system-on-chip integrated circuit of claim 1, wherein:
the second network processing function includes firewall processing.

5. The system-on-chip integrated circuit of claim 1, wherein:
the first network protocol includes a Fibre Channel protocol; and
the second network protocol includes an Ethernet protocol.

6. The system-on-chip integrated circuit of claim 1, wherein:
the first interface unit comprises a programmable media access control interface device.

7. The system-on-chip integrated circuit of claim 1, wherein:
the first set of processor cores comprises a first number of processor cores and the second set of processor cores comprises a second number of processor cores that is less than the first number of processor cores.

8. The system-on-chip integrated circuit of claim 1, wherein:
the first context group includes all packets of the one or more first packets that include link control information.

9. The system-on-chip integrated circuit of claim 1, wherein:
the first context group includes all packets of the one or more first packets that belong to a solicited message.

10. The system-on-chip integrated circuit of claim 1, wherein:
the first context group includes all packets of the one or more first packets associated with a particular position within a sequence of packets.

11. The system-on-chip integrated circuit of claim 10, wherein:
the particular position within the sequence of packets comprises a last packet in the sequence of packets.

12. A system-on-chip integrated circuit, comprising:
a network processor core; and
a reconfigurable protocol converter in communication with the network processor core, the reconfigurable protocol converter and the network processor core integrated on the system-on-chip integrated circuit, the reconfigurable protocol converter includes a plurality of processor cores and a task dispatching processor, the task dispatching processor assigns a first set of processor cores of the plurality of processor cores to perform a first network processing function during a first period of time, the reconfigurable protocol converter performs the first network processing function during the first time period and performs a second network processing function during a second time period subsequent to the first time period, the second network processing function is different from the first network processing function, the first network processing function includes receiving one or more first packets of a first network protocol and converting the one or more first packets into one or more second packets of a second network protocol different from the first network protocol, the task dispatching processor assigns all packets of the one or more first packets belonging to a first context group to a first processor of the first set of processor cores during the first period of time and assigns all packets of the one or more first packets belonging to a second context group to a second processor of the first set of processor cores during the first period of time, the second network processing function includes receiving one or more third packets of a third network protocol and converting the one or more third packets into one or more fourth packets of a fourth network protocol different from the third network protocol, the fourth network protocol is different from the second network protocol, the third network protocol is different from the first network protocol, the reconfigurable protocol converter includes a first interface unit, the first interface unit transmits the one or more second packets during the first time period, the first interface unit transmits the one or more fourth packets during the second time period.

13. The system-on-chip integrated circuit of claim 12, wherein:
the first context group includes all packets of the one or more first packets that include link control information; and
the second context group includes all packets of the one or more first packets that belong to a solicited message.

14. The system-on-chip integrated circuit of claim 12, wherein:
the first context group includes all packets of the one or more first packets that belong to an unsolicited message; and
the second context group includes all packets of the one or more first packets associated with a particular position within a sequence of packets.

15. The system-on-chip integrated circuit of claim 14, wherein:
the particular position within the sequence of packets comprises a first packet in the sequence of packets.

16. The system-on-chip integrated circuit of claim 12, wherein:
the first interface unit is configured as an Ethernet interface unit during the first time period; and
the first interface unit is configured as a Fibre Channel interface unit during the second time period.

17. The system-on-chip integrated circuit of claim 12, wherein:
the first network protocol includes a Fibre Channel protocol; and
the second network protocol includes an Ethernet protocol.

18. The system-on-chip integrated circuit of claim 12, wherein:
the reconfigurable protocol converter performs the second network processing function using a second set of processor cores of the plurality of processor cores different from the first set of processor cores, the first set of processor cores comprises a first number of processor cores and the second set of processor cores comprises a second number of processor cores that is less than the first number of processor cores.

19. A method for reconfiguring a network protocol converter embedded within a system-on-chip integrated circuit, comprising:
assigning a first set of processor cores to perform a first network processing function during a first period of time;
receiving one or more first packets of a first network protocol during the first period of time;
assigning all packets of the one or more first packets belonging to a first context group to a first processor of the first set of processor cores during the first period of time;
assigning all packets of the one or more first packets belonging to a second context group different from the first context group to a second processor of the first set of processor cores during the first period of time;
performing the first network processing function during the first period of time using the first set of processor cores, the performing the first network processing function includes converting the one or more first packets into one or more second packets of a second network protocol different from the first network protocol during the first period of time;
assigning a second set of processor cores different from the first set of processor cores to perform a second network processing function during a second period of time subsequent to the first period of time, the second set of processor cores includes a subset of the first set of processor cores, the second network processing function is different from the first network processing function;
receiving one or more third packets of a third network protocol during the second period of time; and
performing the second network processing function during the second period of time using the second set of processor cores, the performing the second network processing function includes converting the one or more third packets into one or more fourth packets of a fourth network protocol different from the third network protocol during the second period of time, the fourth network protocol is different from the second network protocol, the third network protocol is different from the first network protocol.

20. The method of claim 19, wherein:
the first context group includes all packets of the one or more first packets that include link control information; and
the second context group includes all packets of the one or more first packets that belong to a solicited message.

* * * * *